United States Patent Office 2,970,919
Patented Feb. 7, 1961

2,970,919

CANDY SUSPENSION COMPOSITION FOR FOOD DELICACIES

Paul Perry, Laurelton, N.Y., assignor to V. & E. Kohnstamm, Inc., New York, N.Y., a corporation of New York No Drawing. Filed Mar. 19, 1959, Ser. No. 800,398

1 Claim. (Cl. 99—140)

My invention relates to a composition of matter which can be added to an ice cream mix, an ice mix, a sherbet mix, a pastry mix, or the like, for forming a food delicacy having substantially uniformly shaped candy masses substantially uniformly distributed therein and throughout.

More specifically, my invention relates to a composition of matter comprising a plurality of substantially uniformly shaped gum-containing masses substantially uniformly suspended in a dispersion containing powdered gum dispersed in a mixture of water and a polyhydric alcohol. With my novel composition of matter, a candy-containing delicacy such as frozen ice cream is easily and economically produced without the heretofore common occurrence of fruit flavor and gum separation into layers and without the lumping and balling of the gum ingredients during the manufacture thereof. Also, with my novel composition of matter, it is possible to add simultaneously the stabilizer, viz. the gum dispersed in the mixture of water and alcohol, and the flavoring material including the fruit flavor, to a mix whether it be ice cream, ice, sherbet, or pastry, or the like, at the start of the mixing process.

Heretofore, in the presently known processes for producing any of the hereinbefore set forth food delicacies where it was desired to suspend candy masses, it has been necessary to add said candy masses to the mix after the gum stabilizer had been added and after the fruit flavoring had been added for the reason that both the candy masses and the gum stabilizer adversely affected the operation of the mixing equipment because of the formation of lumps and also because of the sticking of both the candy masses and the gum stabilizer to various portions of the equipment. Furthermore, where water alone was used to form the stabilizer dispersion, there was formed a mass in which the candy masses were incapable of uniform suspension. Where a dispersion of gum and a polyhydric alcohol alone was used, likewise the candy masses were incapable of uniform suspension therein. I have found that, by using a mixture of a carrier such as polyhydric alcohol together with water, I am able to form a composition of matter wherein the candy masses contain a gum and are substantially uniformly suspended in a dispersion containing the same type of gum dispersed in said mixture of water and the polyhydric alcohol. This novel composition of matter also is compatible with the flavoring material to be added to the food delicacy. I have also found that my novel composition of matter has a long shelf life and that the candy masses will remain substantially uniformly suspended therein and throughout as will the fruit flavoring material and the stabilizer gum and, when added to and incorporated in the food delicacy mix, will result in a food delicacy whether it be frozen, or whether it be a pastry, which will likewise have a long shelf life and in which the candy masses will remain substantially uniformly suspended.

An object of my invention is to provide a composition of matter adapted to be added to an ice cream mix, an ice mix, a sherbet mix, a pastry mix, or the like, for forming a food delicacy having candy masses substantially uniformly distributed therein and throughout without any separation into layers of the candy masses therefrom.

Another object of my invention is to provide a composition of matter adapted to be added to an ice cream mix, an ice mix, a sherbet mix, a pastry mix, or the like, for forming a food delicacy having candy masses substantially uniformly distributed therein and throughout, whereby a gum stabilizer and the candy masses are simultaneously added to the respective mix and whereby the candy masses and the gum stabilizer will not separate therefrom into layers.

Another object of my invention is to provide a composition of matter adapted to be added to an ice cream mix, an ice mix, a sherbet mix, a pastry mix, or the like, whereby the gum stabilizer and the candy masses and the fruit flavoring are simultaneously added to the respective mix and whereby the candy masses, the gum stabilizer and the fruit flavoring will not separate therefrom into layers.

Another object of my invention is to provide a composition of matter adapted to be added at the beginning of the mixing process to an ice cream mix, an ice mix, a sherbet mix, a pastry mix, or the like, said composition of matter containing a stabilizer for the food delicacy, a fruit flavoring for the food delicacy, and uniformly shaped candy masses suspended therein, whereby there is formed a food delicacy having said candy masses uniformly distributed therein and throughout.

Another object of my invention is to provide a composition of matter adapted to be added to an ice cream mix, an ice mix, a sherbet mix, a pastry mix, or the like, at the beginning of the mixing process for producing one of said food delicacies, comprising substantially uniformly shaped gum-containing masses suspended in a thickened mixture of water and a polyhydric alcohol.

Other objects of my invention will become readily apparent from the following detailed description, which is merely illustrative of my invention and does not limit my invention.

I have prepared for the first time a composition of matter adapted to be added to an ice cream mix, an ice mix, a sherbet mix, a pastry mix, or the like, for forming a food delicacy having uniformly shaped candy masses, commonly known as gum drops, uniformly dispersed therein and throughout, said composition including uniformly shaped gum-containing masses suspended in a dispersion of a gum in a mixture of water and a polyhydric alcohol. This novel composition of matter and the food delicacy having said composition of matter incorporated therein, each have a long shelf life. Also within the scope of this invention is the composition of matter comprising the uniformly shaped gum-containing masses suspended in a dispersion of a gum in a mixture of water and a polyhydric alcohol and a flavoring material. Also within the scope of my invention is the composition of matter, as hereinabove described and set forth, including a sweetening agent in the gum-containing masses. Gum drops, or uniformly shaped candy masses, are well known in the art. However, it has heretofore not been possible to suspend such gum drops in a food delicacy such as ice cream, sherbet or ice, each of which is frozen, or in a pastry mix which has as one of its chief ingredients flour, in such a manner that the gum drops, or candy masses, will remain uniformly suspended in and dispersed throughout said delicacy. Furthermore, where attempts have been made to prepare such a food delicacy having candy masses or gum drops dispersed therein, the flavoring material and the gum stabilizers present therein tended to settle to the bottom of the prepared food delicacy. Also, the proper addition of sweetening materials was hindered.

In preparing my novel composition of matter, it is of extreme importance that the gum drops, or gum-containing masses, be thoroughly wetted with the thickened mixture of water and a polyhydric alcohol, and this is accomplished by complete and thorough agitation. I prepare my novel composition in the following manner: Glucose or a liquid corn syrup, cane sugar, a gum, and water are mixed and agitated and this mixture is heated until it begins to boil. After this mixture has been brought to boiling or its beading point, it is then poured into molds which have been dusted with starch and allowed to set. If desired, a food coloring material may also be added to the aforedescribed mixture. These molds are of such dimensions that a plurality of circular masses, referred to herein for the sake of convenience as gum drops, of approximately ¼ inch in diameter and approximately ⅟₁₆ to ³⁄₃₂ of an inch in thickness, are formed. The respective amount of each of the aforementioned ingredients is determined in accordance with the desired specific characteristics of the candy mass or gum drop, viz. hardness, chewiness and sweetness. After the formation of the aforedescribed gum drops, I form my novel composition of matter by mixing a gum, a polyhydric alcohol, a flavoring material, water and a plurality of the gum drops and thoroughly and completely agitate this mixture until said gum drops are thorough-wetted by the thickened mixture of water and polyhydric alcohol so formed. Here again, the respective amount of each of the various ingredients is not critical, the only requirement being that the gum drops, and all surface portions of the gum drops, be thoroughly wetted by the thickened mixture of water and the polyhydric alcohol. The gum in this thickened mixture, of course, acts as a stabilizer for the food delicacy, viz. ice cream, ice, sherbet, pastry and the like. The mixture of the polyhydric alcohol and the water, of course, acts as a carrier for the stabilizer. By mixing and agitating the gum, polyhydric alcohol, the water, and, if desired, the flavoring material, I form a dispersion of said gum in a mixture of water and polyhydric alcohol. By stirring or agitating the entire aforesaid mixture, including the gum drops, I uniformly distribute and disperse said gum drops, or candy masses, or gum-containing masses, in the dispersion of the gum stabilizer in said mixture of water and polyhydric alcohol.

In preparing the uniformly shaped candy masses, or gum containing masses, or gum drops, the preferred sweetening materials are any glucose or liquid corn syrup and cane sugar, and the preferred gums are gum tragacanth, gum arabic or gum acacia or a water-dispersible cellulose ether such as sodium carboxymethylcellulose. In preparing the thickened mixture of water and polyhydric alcohol containing the stabilizer gum, the preferred gums are gum tragacanth, gum arabic or gum acacia or a water-dispersible cellulose ether such as sodium carboxymethylcellulose. Further, in preparing said thickened mixture of water and polyhydric alcohol containing the gum stabilizer, the preferred polyhydric alcohols are propylene glycol, natural glycerine or synthetic glycerine. The flavoring material may be true fruit and flavoring extracts in the form of puree or synthetic fruit and flavoring materials. For example, such flavoring materials as strawberry, cherry, and grape are added as fruit puree, while such flavoring materials as orange, lemon, lime, and tangerine are added by means of fruit sacs. Also, synthetic or natural vanilla flavor may be added. In addition, a preservative such as sodium benzoate and/or isoascorbic acid may be added.

My invention is further shown by the following examples which are illustrative only and are not to be considered as limiting:

*Example 1*

In preparing the gum drops or uniformly shaped candy masses, the ingredients are as follows:

| Ingredient: | Parts by weight |
|---|---|
| Glucose, or liquid corn syrup | 50 |
| Cane sugar | 50 |
| Gum arabic | 15 |
| Water | 35 |

The foregoing ingredients are mixed and brought to a boil or the beading point, and the so-prepared mixture is poured into molds each dusted with starch to prevent sticking. The so-molded candy masses or gum drops are allowed to set, and the dimensions of the mold are such that a circular or substantially circular gum drop approximately ¼ of an inch in diameter and approximately ⅟₁₆ to ³⁄₃₂ of an inch in thickness is formed. However, the shape of the gum drop and the dimensions thereof are not critical and may be as desired.

In preparing the thickened mixture of water and polyhydric alcohol having the flavoring material admixed therewith, the ingredients are as follows:

| Ingredients: | Parts by weight |
|---|---|
| Gum tragacanth | 1 |
| Polyhydric alcohol, such as propylene glycol, natural glycerine, or synthetic glycerine | 16 |
| Flavoring material, such as true fruit puree, or oil emulsion, or pure vanilla, or synthetic vanilla, fruit sac | 2 |
| Water | 8 |

The foregoing ingredients are thoroughly and completely agitated, and a preservative, in small amounts, such as sodium benzoate and/or isoascorbic acid may be added. The gum tragacanth is preferably added in the form of powder. To the so-prepared mixture is then added 152 parts, by weight, of the aforedescribed prepared candy masses or gum-containing masses or gum drops, and the entire mixture of 27 parts, by weight, of the thickened mixture of water and polyhydric alcohol and of 152 parts, by weight, of the so-prepared gum drops are thoroughly and completely agitated to form my composition of matter comprising the uniformly shaped gum drops suspended uniformly in a dispersion of a gum stabilizer in a mixture of water and polyhydric alcohol. This composition of matter is then added directly to an ice cream mix, or to an ice mix, or to a sherbet mix, or to a pastry mix for forming cookies at the start of the mixing process to form the respective food delicacy having gum drops uniformly dispersed therein and throughout.

*Example 2*

The gum drops are prepared as in Example 1, and the thickened mixture of water and polyhydric alcohol is also prepared as in Example 1, except that in preparing the latter 12 parts, by weight, of gum arabic are utilized instead of the one part, by weight, of gum tragacanth. Thus, here there is formed 38 parts, by weight, of the thickened mixture of water and polyhydric alcohol. This 38 parts is then admixed with 152 parts, by weight, of the so-prepared gum drops, and the same procedure as in Example 1 is followed.

*Example 3*

The gum drops are prepared as in Example 1, and the thickened mixture of water and polyhydric alcohol is also prepared as in Example 1, except that in preparing the latter, one part, by weight, of sodium carboxymethylcellulose is utilized instead of the one part, by weight, of the gum tragacanth. Thus, here also, as in Example 1 is formed 27 parts, by weight, of the thickened mixture, which is admixed with 152 parts, by weight, of the so-prepared gum drops, and the same procedure as in Example 1 is followed.

*Example 4*

The gum drops are prepared as in Example 1, and the thickened mixture is also prepared as in Example 1, except that 12 parts, by weight, of starch are utilized in place of the one part, by weight, of the gum tragacanth, and the procedure of Example 2 is then followed.

In preparing my novel compositions of matter all ingredients are of food grade and only U.S. certified coloring and flavoring materials are used, and the organic carrier in the thickened mixture containing water is preferably a polyhydric alcohol.

Many changes and alterations may be made without departing from the spirit and scope of this invention which is set forth in the appended claim which is to be construed as broadly as possible in view of the prior art.

I claim:

A composition of matter adapted to be added to frozen confection mixes and pastry mixes for forming a food delicacy having candy masses uniformly distributed therein and throughout comprising shaped masses of sweetening material and a gum selected from the group consisting of gum tragacanth, gum arabic, gum acacia and sodium carboxymethylcellulose uniformly suspended in a mixture of a gum selected from the group consisting of gum tragacanth, gum arabic, gum acacia and sodium carboxymethylcellulose, water, and a polyhydric alcohol selected from the group consisting of propylene glycol and glycerine.

References Cited in the file of this patent
UNITED STATES PATENTS

| | | |
|---|---|---|
| 1,545,993 | Alsberg | July 14, 1925 |
| 2,821,479 | Forkner | Jan. 28, 1958 |
| 2,823,129 | Steinitz | Feb. 11, 1958 |